US010358241B2

(12) United States Patent
Findlay

(10) Patent No.: US 10,358,241 B2
(45) Date of Patent: Jul. 23, 2019

(54) GRIPPER DEVICE FOR PICKING UP AND RELEASING A GROUP OF FOOD SLICES

(71) Applicant: Thurne-Middleby Ltd, Norwich (GB)

(72) Inventor: Ben James Wilson Findlay, Norfolk (GB)

(73) Assignee: Thurne-Middleby Ltd, Norwich (GB)

( * ) Notice: Subject to any disclaimer, the term of this patent is extended or adjusted under 35 U.S.C. 154(b) by 660 days.

(21) Appl. No.: 14/970,958

(22) Filed: Dec. 16, 2015

(65) Prior Publication Data

US 2016/0176561 A1   Jun. 23, 2016

(30) Foreign Application Priority Data

Dec. 17, 2014   (EP) ..................................... 14198477

(51) Int. Cl.
*B65B 35/36*   (2006.01)
*B25J 15/00*   (2006.01)
(Continued)

(52) U.S. Cl.
CPC ........... *B65B 35/36* (2013.01); *B25J 11/0045* (2013.01); *B25J 15/0014* (2013.01); *B65B 25/06* (2013.01);
(Continued)

(58) Field of Classification Search
CPC ....... B65B 35/36; B65B 25/06; B65B 25/064; B65B 25/065; B65B 35/30; B25J 15/0014;
(Continued)

(56) References Cited

U.S. PATENT DOCUMENTS 4,048,784 A * 9/1977 Toby ........................ B26D 7/32
198/468.6
6,412,844 B1 * 7/2002 Hendzel ................... B25J 15/08
294/113
(Continued)

FOREIGN PATENT DOCUMENTS

DE   102010028410 A1   11/2011
DE   102011010542 A1 * 11/2011 ............. B65B 25/06
WO   2010105831 A1     9/2010

OTHER PUBLICATIONS

Espacenet, English Machine Translation of WO2010105831A1, published Sep. 23, 2010, retrieved from http://worldwide.espacenet.com (11 pages).
(Continued)

*Primary Examiner* — Alexander M Valvis
*Assistant Examiner* — Katie L Gerth
(74) *Attorney, Agent, or Firm* — Wood Herron & Evans LLP

(57) ABSTRACT

The present invention relates to a gripper device for picking up and releasing a group of food slices, the group of slices being arranged with a slice at one end lying on a support surface and each subsequent slice through to the slice at the other end lying against the preceding slice and being displaced relative to the preceding slice. A counter hold is provided opposite a first structure which comprises a first blade portion. A displacement mechanism is provided for moving at least one of the first structure and the counter hold away from and towards the other. A tilting mechanism is able to rotate the blade portion. To pick up a group of food slices, at least one of the first structure and the counter hold moves towards the other. The tilting mechanism rotates the first blade portion such that it tilts towards the counter hold (Continued)

causing the group of food slices to be arranged in a stack between the first blade portion and the counter hold.

4 Claims, 13 Drawing Sheets

(51) Int. Cl.
*B65B 25/06* (2006.01)
*B65G 47/90* (2006.01)
*B25J 11/00* (2006.01)

(52) U.S. Cl.
CPC ...... *B65G 47/90* (2013.01); *B65G 2201/0202* (2013.01); *B65G 2201/022* (2013.01)

(58) Field of Classification Search
CPC .... B25J 15/00; B25J 15/0052; B25J 15/0061; B65G 47/90
USPC ..... 53/542; 294/81.6, 81.61, 81.62, 92, 164, 294/902, 86.4, 67.22
See application file for complete search history.

(56) References Cited

U.S. PATENT DOCUMENTS

| | | | | |
|---|---|---|---|---|
| 6,808,361 B1* | 10/2004 | Christy | ................ | B65G 57/32 198/418.9 |
| 7,611,181 B2* | 11/2009 | van Beusekom | ...... | B65G 47/90 294/106 |
| 7,887,108 B1* | 2/2011 | Cawley | ................ | B25J 15/022 294/106 |
| 8,317,241 B2* | 11/2012 | Ehnes | ...................... | B25J 9/142 294/192 |
| 2009/0097956 A1* | 4/2009 | Landes | ................... | B65B 35/16 414/788.3 |
| 2010/0133862 A1* | 6/2010 | Hawes | ................... | B25J 15/024 294/2 |
| 2010/0225132 A1 | 9/2010 | Weber | | |
| 2012/0086226 A1* | 4/2012 | Weber | ................. | B25J 11/0045 294/81.54 |
| 2012/0280522 A1* | 11/2012 | Tygard | ................... | B66C 1/427 294/81.61 |
| 2013/0033049 A1* | 2/2013 | Lang | ................. | A22C 17/0093 294/67.2 |
| 2013/0037391 A1* | 2/2013 | Carre | ..................... | B65G 23/44 198/814 |
| 2014/0031978 A1* | 1/2014 | Takata | ................. | B25J 11/0045 700/245 |
| 2014/0037402 A1* | 2/2014 | Ickert | ..................... | B65G 47/90 414/226.02 |

OTHER PUBLICATIONS

Espacenet, English Machine Translation of DE102010028410A1, published Nov. 3, 2011, retrieved from http://worldwide.espacenet.com (13 pages).

European Patent Office, Extended European Search Report, Application No. 14198477.3, dated Jun. 12, 2015 (5 pages).

* cited by examiner

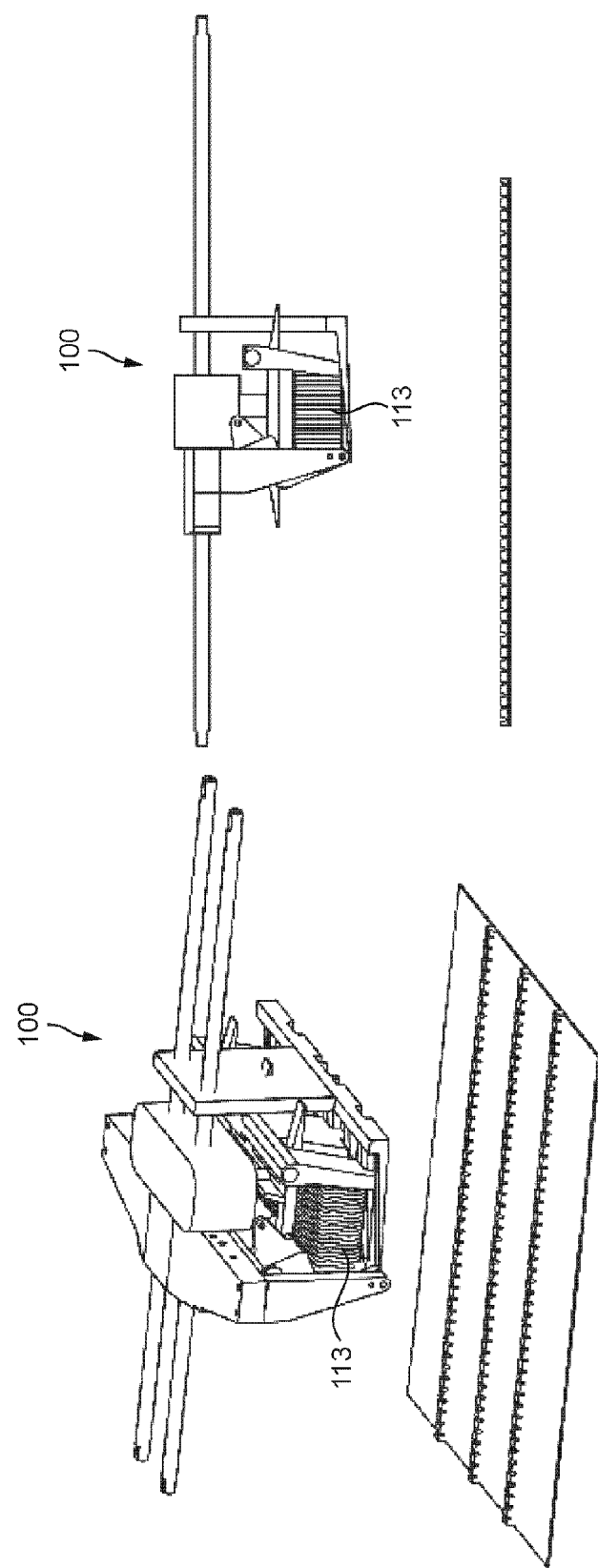

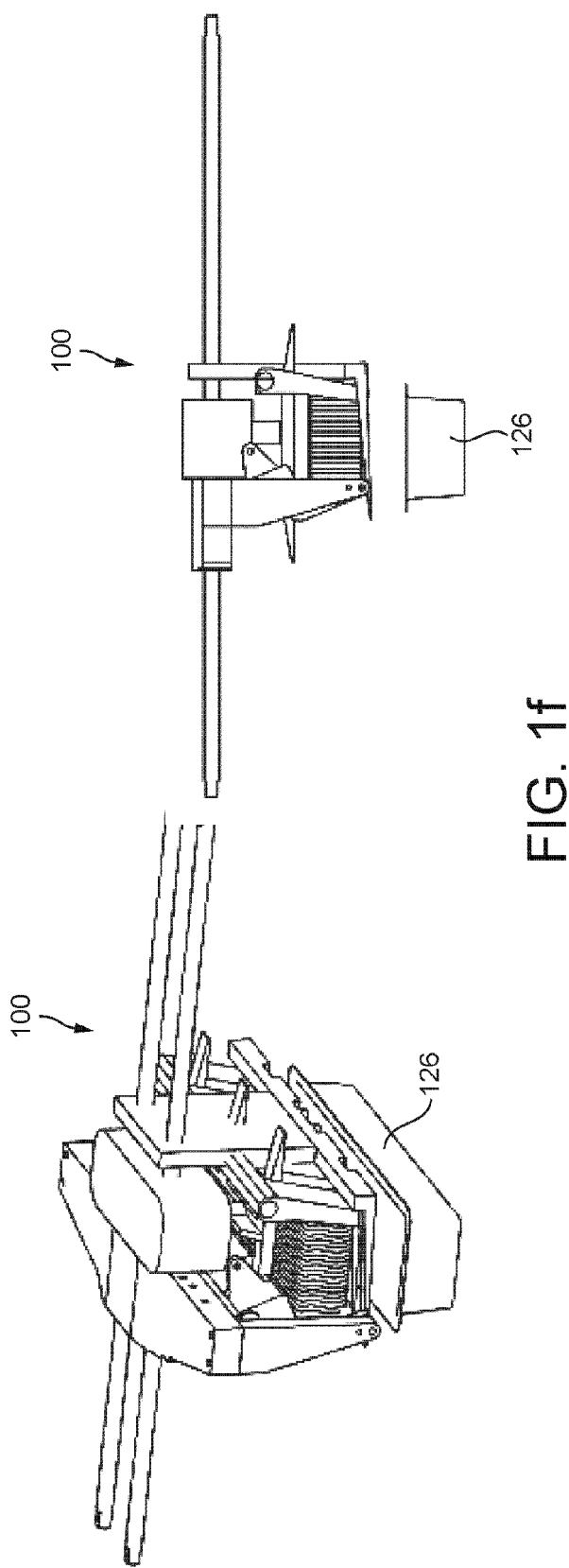

GRIPPER DEVICE FOR PICKING UP AND RELEASING A GROUP OF FOOD SLICES

CROSS-REFERENCE TO RELATED APPLICATIONS

The present application claims priority under 35 U.S.C. § 119 of European Patent Application No. 14198477.3, filed Dec. 17, 2014, the disclosure of which is hereby incorporated herein by reference in its entirety.

FIELD OF THE INVENTION

The present invention relates to a gripper device for picking up food slices from a first position and releasing them at a second position.

BACKGROUND OF THE INVENTION

Insertion of sliced food products such as bacon slices into packaging receptacles such as trays is commonly done manually. The packaging receptacles may then be moved to a sealing area, for example a modified-atmosphere packaging area, where the packaging receptacle is sealed with a plastic film.

In addition to the labour costs involved, when packing into packaging receptacles by hand it is difficult to minimise the amount of packaging material that is used.

Also, due to this manual handling, grease originating from the hands/gloves of the operators is frequently left on the packaging receptacles which may cause severe problems when sealing the packaging receptacles.

Accordingly, the commonly used packaging methods are not only costly due to the labour needed, but also the packing methods are environmentally unfriendly due to the excess of packing material being used.

SUMMARY OF THE INVENTION

Embodiments of the present invention seek to provide a gripper device for picking up groups of sliced food products and placing them directly into packaging receptacles such as trays.

Embodiments of the present invention preferably seek to mitigate, alleviate or eliminate one or more of the above-mentioned disadvantages singly or in any combination.

In particular, embodiments of the present invention may seek to provide a gripper device that solves the above-mentioned problems, or other problems, of the prior art.

A first aspect of the present invention provides a gripper device for picking up and releasing a group of food slices, the group of slices being arranged with a slice at one end lying on a support surface and each subsequent slice through to the slice at the other end lying against the preceding slice and being displaced relative to the preceding slice, wherein the gripper device comprises:

a first structure comprising a first blade portion having a leading edge and an upper surface for sliding beneath the one end of the group of slices, a counter hold which defines an engagement surface for engaging the slice at the other end of the group of slices, a displacement mechanism for moving at least one of the counter hold and the first structure towards and away from the other, and a tilting mechanism for tilting the first blade portion, the displacement mechanism being operable to move at least one of the first structure and the counter hold towards the other so as to cause the leading edge of the first blade portion to be positioned beneath the one end of the group of slices, and the tilting mechanism being operable to tilt or rotate the first blade portion such that its upper surface faces towards the engagement surface of the counter hold, causing the group of food slices to be arranged in a stack extending between the first blade portion and the engagement surface.

Accordingly, a gripper device is provided that is capable of picking up a group of food slices, such as bacon slices, meat slices or the like, in a reliable manner, where no intervention of manual labour is required and thus the associated labour costs may be saved.

Preferably, it is possible to compress the stack of food slices together with the gripper device and thus put them into a compartment of a packaging receptacle, such as a tray, in a partly compressed state. Therefore, the volume of the stack is reduced. As a result, less packaging receptacle material may be needed for a given weight of product.

Moreover, since no manual handling is needed the deposition of grease on the sealing surfaces of the packaging receptacles may be avoided, making the sealing of the packaging receptacles much more reliable.

The gripper device is suitable for use in an automated packing system. It may be moved from one location to another by a moving mechanism under automated control. The moving mechanism may comprise a robot arm or another form of mechanised carrying arrangement. The throughput may be increased significantly, both due to the speed of operation of the gripper device and the automated packing system, and also because more than one gripper device may be used simultaneously.

The gripper device is directed at picking up a group of slices resting on a support surface. The device is suitable for picking up a group of slices arranged with a first slice at one end lying on the support surface and each subsequent slice lying against the preceding slice and displaced relative to the preceding slice. Each subsequent slice may be displaced across the support surface relative to the preceding slice.

The group is preferably arranged such that the first food slice is lying flat (its tilting angle is zero) on the support surface. Each of the following food slices is in contact with the preceding slice, is slightly displaced relative to the preceding slice, and has a slightly increased tilting angle relative to the preceding slice. The food slice at the opposite end of the group of food slices has the highest tilting angle. For example, it may be almost vertical in relation to the support surface, or even be vertical.

Each slice in the group to be picked up may be displaced laterally across the support surface relative to the preceding slice. Each successive slice is preferably displaced in the same direction relative to the preceding slice as the displacement of the preceding slice. Different groups may have different rotational orientations of this direction on the support surface.

The group of food slices may originate from a slicing machine, for example a high speed slicing machine that may be used to slice bacon belly into slices. After each cut slice is placed on a support such as a conveyor belt, the support is moved slightly, for example in discrete steps, such that each subsequent food slice is in contact with the previous food slice to some extent. The group of food slices is not arranged in a vertically stacked manner, but is spread over the support.

The gripper device is operable to tilt the first slice from its initial position lying with a side face in contact with the support surface to an upright, stacked position where it is resting on its edge on the support surface. At the same time, the other slices in the stack are tilted to the extent needed to bring them to the same orientation, resulting in a stacked formation across the support surface.

The displacement mechanism is operable to move at least one of the first structure and the counter hold towards the other. This movement may be along a linear path or a curved path. The movement may be facilitated by the first structure and/or the counter hold being mounted for movement along one or more guides in the gripper device such as slider tracks for example. The first structure and/or the counter hold may be movable in a direction parallel to a longitudinal reference axis of the gripper device. In other embodiments they may be movable in directions which are at an angle to each other, along paths which are linear or curved.

The tilting mechanism may adjust the angle of the first blade portion by tilting or rotating it, preferably at the same time as the first structure and counter hold move together. This tilting or rotation is preferably about a rotational axis which is transverse with respect to the motion of the first structure and/or counter hold. Preferably, the rotational axis coincides with or is adjacent to the leading edge of the first blade portion.

As the first blade portion is brought into engagement with the group of slices, its upper surface is preferably orientated such that it is inclined downwardly towards its leading edge. This may assist the first blade portion in lifting and beginning to tilt the end of the group of slices.

The counter hold defines an engagement surface for engaging the slice at the opposite end of the group to the first structure. This surface preferably defines a plane which is substantially perpendicular to the direction of motion of the first structure and/or counter hold. This plane may be inclined such that the lower end of the counter hold is closer to the first structure than its upper end.

Preferably, the first blade portion tilts in such a way that its trailing end, which initially is further from the engagement surface of the counter hold, moves further towards the engagement surface than its leading edge, which is closer to the engagement surface.

The tilting of the first blade portion may serve to move its upper surface towards a more upright orientation, opposite to and facing the engagement surface of the counter hold.

The first blade portion may comprise a plurality of spaced apart teeth. This may be beneficial for example when the support surface includes raised ribs.

The first structure preferably includes a stop at a trailing end of the first blade portion for engaging with a slice as the upper surface of the blade portion moves beneath it. The stop may be in the form of an upstanding wall, for example. It may act to limit the distance to which the end of the group moves across the blade portion.

The gripper device may further comprise a second structure having a second blade portion arranged to selectively provide an under-support for the stacked food slices. Thus, a support may be provided under the food slices, which eliminates any risk that the food slices may slide down from the gripper device. The second structure is preferably positioned below the stack of food slices at least (or only) during movement of the loaded gripper device from one location to another. This is to ensure that the stack is held securely during these operations, as high accelerations may be used to minimise the time taken for these movements. The side forces exerted on a stack by the first structure and the counter hold may be sufficient on their own to retain the stack in the gripper device whilst it is stationary.

Preferably, the second structure is arranged on the opposite side of the counter hold to the first structure. In other embodiments, the second structure may be arranged on the same side of the counter hold as the first structure. The second structure may be moveable from a position adjacent to the region swept by movement of the first structure and the counter hold, to a position where it extends beneath a stack located between the first structure and the counter hold. In further embodiments, the second structure may be arranged to one side of the first structure and counter hold, before a group of slices has been picked up. It may initially be at a position displaced laterally with respect to the direction of motion of the first structure and/or counter hold.

The second blade portion of the second structure may have a fork-like structure.

In a preferred embodiment, both the second structure and the counter hold are moveable by the displacement mechanism.

The second blade portion of the second structure may comprise a plurality of spaced apart teeth, and the counter hold may comprise spaced apart openings positioned and dimensioned such that the spaced apart teeth can extend through the spaced apart openings. This may also be beneficial for example when the support surface includes raised ribs and the teeth are configured to align with the regions between the ribs. When the gripper device is lowered towards the support surface, the teeth pass between the ribs and are therefore able to move lower than the upper surfaces of the ribs, rather than resting on top of the ribs. This assists the penetration of the second blade portion under a group of slices resting on the ribs as it moves horizontally beneath the edge of the group. The leading edge(s) of the second blade portion may be relatively narrow or more rounded in side profile or have another profile to suit a particular application.

The process of picking up the group of food slices may comprise moving at least one of the counter hold and the first structure towards the other, and simultaneously and/or subsequently moving the second structure until the spaced apart teeth extend through the spaced apart openings of the counter hold with their distal ends positioned adjacent or beyond the first structure. Thus, an arrangement is provided for obtaining both side support and support beneath the group of slices.

The gripper device may further comprise a top structure. The top structure may be operably connected to a top structure displacement mechanism for moving the top structure towards and away from a stack held in the gripper device. The top structure may be adapted to facilitate the release of the stacked food slices from the gripper device by applying a force onto the stack of food slices. This may for example be achieved by a downward movement of the top structure carried out by the top structure displacement mechanism.

The top structure may also assist the deposition of the stacked food slices in a compressed state into packaging receptacles. The packaging may have one or more compartments shaped such that they essentially correspond to the stack width (from one end slice to the other), shape or profile of the stacked food slices in their compressed state. This means that the dimensions of the compartments and thus the packaging receptacles may be greatly reduced, relative to packing the food slices in their non-compressed state.

One way of releasing the stacked food slices directly into the packaging receptacles in a compressed state is to push the stacked food slices out of the gripper device via the force supplied by the top structure while the first structure and the counter hold are in a contracted position and exerting opposing forces onto the food slices.

Another way of releasing the stacked food slices is to exert the force supplied by the top structure either shortly before or shortly after (for example by a fraction of a second) the first structure and the counter hold start to move back to their open position.

The release of the stacked food slices at the second position may comprise:

applying a vertical force onto the stacked food slices, moving at least one of the counter hold and the first structure away from the other so as to reduce the side pressure on the stacked food slices.

The top structure may comprise a plurality of elongate fingers which extend laterally from a common support structure. The fingers may be laterally spaced apart and dimensioned such that they pass through openings in the first structure and the counter hold as these components move towards each other. This configuration enables the top structure to reliably exert a downward force on the entire length of a stack of slices held between the first structure and the counter hold, and ensure that the entire stack is ejected. The fingers may be tapered towards their outer ends to ensure that they do not impede the movement relative thereto of the first structure and counter hold.

In one embodiment, the first structure is an L-shaped structure and/or the second structure is an L-shaped structure. In embodiments where the first and second structures are on opposite sides of the counter hold, the L-shape of the second structure is reversed relative to the L-shape of the first structure. Conversely, in embodiments where the first and second structures are on the same side of the counter hold, the L-shape of the second structure is not reversed relative to the L-shape of the first structure.

In a second aspect of the present invention, a method is provided for picking up and moving a group of food slices from a first position to a second position where the food slices are released, using the above-mentioned gripper device. The method comprises:

moving the first structure and the counter hold to a group of food slices to be picked up such that the first structure is positioned adjacent to the slice at the one end of the group of food slices, and the counter hold is positioned adjacent to the slice at the other end of the group of food slices, moving at least one of the first structure and the counter hold towards the other, tilting the first blade portion such that its upper surface faces towards the engagement surface of the counter hold, causing the group of food slices to be arranged in a stack extending between the first blade portion and the engagement surface.

Accordingly, an automated method may be provided of picking up and moving a group of food slices from a first position to a second position. The second position may for example be in a product loading area of a packaging machine. The second position may be stationary. Alternatively, it may be moving. For example, a receptacle carried by a conveyor may be the second position.

Food products such as thin food slices (for example bacon), may be packed automatically and thus save manual labour.

The step of releasing the stacked food slices at the second position may include releasing the stacked food slices vertically into a compartment of a packaging receptacle while the stacked food slices are compressed together, with the compartment having a shape which essentially follows the shape of the stacked food slices in their compressed state.

The method may further comprise applying a vertical force onto the stacked food slices when releasing the stacked food slices at the second position while the stacked food slices are being compressed together or are in a compressed state. Packing the stacked food slices in packaging receptacles whilst in a compressed state reduces the volume of the stack. This may allow the amount of packaging receptacle material required for a given weight of food product to be reduced, which makes the method more environmentally friendly.

The method preferably includes supplying an under-support for the stacked food slices. This ensures that the food slices will not slide out of the gripper device unintentionally.

In a third aspect of the present invention, a robot operated packing system is provided for picking up and moving a group of food slices from a first position to a second position where the food slices are released, where the robotic operated packing system comprises:

the above-mentioned gripper device, and a packaging receptacle supply, wherein the gripper device is adapted to release the stack of food slices at the second position into a packaging receptacle provided by the packaging receptacle supply.

The food slices may be considered as being a group of "n" food slices including a first food slice at a first end of the group of food slices that is lying substantially flat on a support surface at the first position. In other words it is at an angle in relation to the support surface that is substantially 0°. An n-th food slice at an opposite end of the group of food slices may be standing substantially vertically relative to the support surface, that is it has an angle in relation to the support surface of substantially 90°. The food slices between the first food slice and the n-th food slice may be at a gradually increasing angle in relation to the support surface. Thus, the food slice closest to the first food slice may have an angle close to 0° and the (n−1)-th slice may have an angle close to 90°.

Accordingly, the first structure may be arranged at the first food slice of the group of food slices resting on a support surface, and the counter hold located at the n-th food slice at the opposite end of the group of food slices. The first structure is adapted to penetrate beneath and move between the first food slice and the support surface. Thus, when the tilting mechanism adjusts the tilting angle of the first structure, the food slices of the group that are not already vertical are moved to a substantially vertical orientation in a horizontally stacked arrangement.

In general the various aspects of the present invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the accompanying schematic drawings, in which:

FIGS. 1a to 1i each show a perspective view and a side view of a gripper device according to an embodiment of the present invention, at successive stages in operation of the gripper device to pick up and release a group of food slices;

FIG. 3 shows an enlarged perspective view of the first blade portion 104 of the gripper device shown in FIG. 1a;

FIG. 4 shows an enlarged perspective view of the counter hold 102 of the gripper device shown in FIG. 1a.

DESCRIPTION OF EMBODIMENTS

Figure 1A:
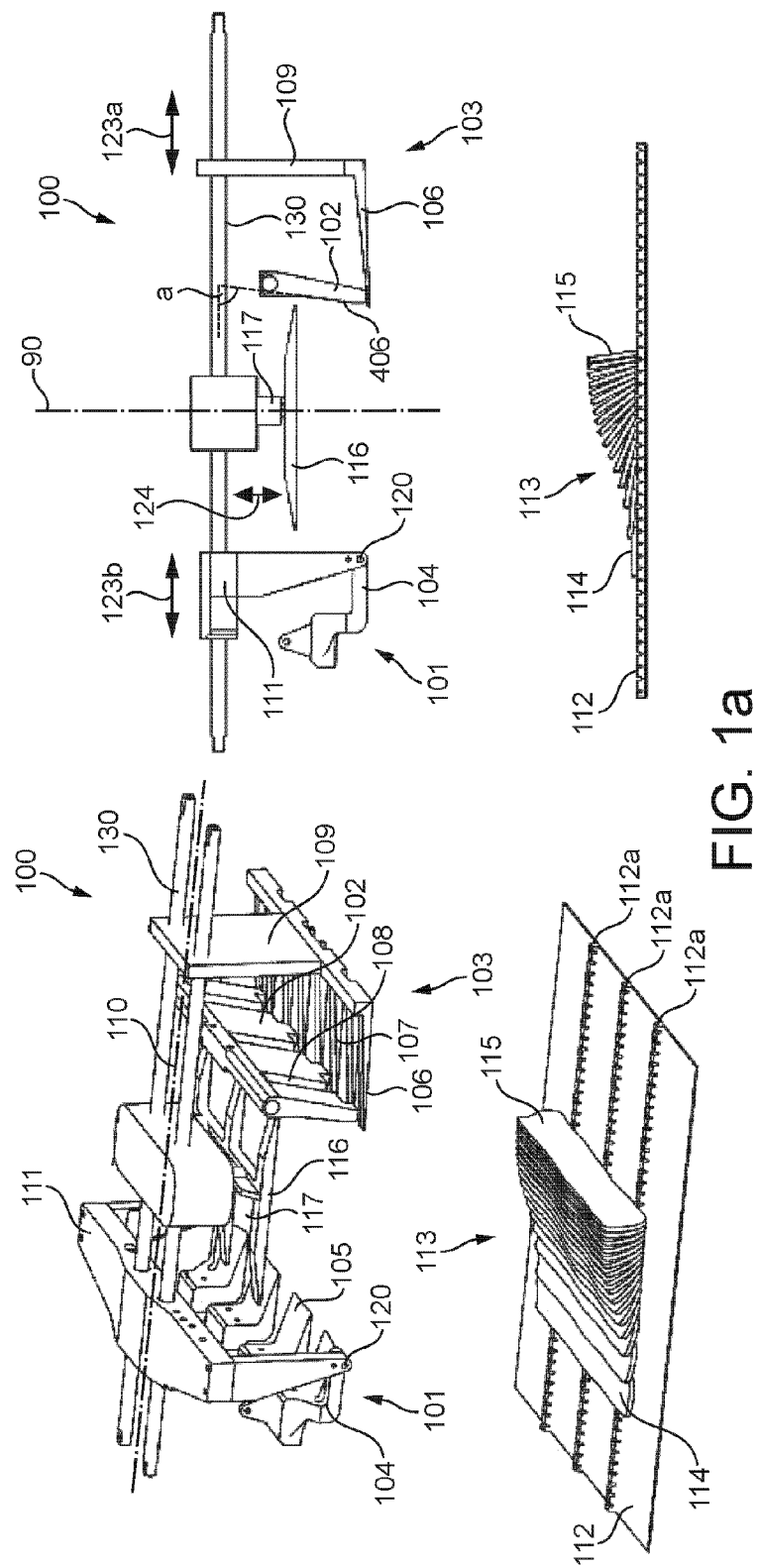

FIGS. 1a to 1i shows a gripper device 100 according to an embodiment of the present invention. The gripper device is adapted to pick up and move a group of food slices 113 from a first position and release them at a second position after movement of the device by a carrying arrangement such as a robotic arm, for example.

In the example shown here, the food slices are bacon slices, with a first food slice resting on a horizontal support surface (with tilting angle of zero), such as a conveyor belt. Each subsequent food slice rests partly on the previous food slice such that the tilting angle increases with each food slice such that the food slice at the opposite end of the group of food slices may have an tilting angle close to 90° or even at 90° compared to the plane of the support surface. The food slices that the gripper device is able to handle are not limited to bacon, but may be any type of food slices such as chops, or slices of loin for example.

The gripper device has a first structure 101 and a counter hold 102 which are moveable towards and away from each other along a pair of slider tracks 130. The tracks are parallel to a longitudinal reference axis 110. In use of the device, the reference axis is orientated parallel to the plane defined by the support surface below a group of slices to be picked up.

The counter hold 102 defines an engagement surface which is substantially perpendicular to the reference axis 110, for example, perpendicular ±10°. In the embodiment illustrated, the engagement surface is slightly off-perpendicular such that its lower end is closer to the vertical centreline 90 of the device than its upper end, to assist retention of a stack in the device. Preferably the surface is slightly off-perpendicular in this manner such that it subtends an angle (marked "a" in FIG. 1a) of 83°±5° with the reference axis.

The first structure 101 has a first blade portion 104, and is arranged opposite to the counter hold 102 such that the first blade portion 104 extends towards the counter hold 102.

In the illustrated embodiment, the first structure is a substantially L-shaped structure, but the shape of the first structure should not be construed as being limited to such an L-shaped structure. In the example shown in the drawings, the first blade portion comprises a plurality of spaced apart teeth 105. This may be beneficial for example when the support surface 112 includes raised ribs 112a and the teeth are configured to align with the regions between the ribs. When the gripper device is lowered towards the support surface, the teeth pass between the ribs and are therefore able to move lower than the upper surfaces of the ribs, rather than resting on top of the ribs. This assists the penetration of the blade portion under a group of slices resting on the ribs as it moves horizontally beneath the edge of the group.

Nevertheless, the use of a gripper device as described herein is not limited to picking up a group of slices from a support that includes raised ribs. The first and/or second blade portions do not necessarily need to comprise spaced apart teeth.

The gripper device further comprises a displacement mechanism 511 (see FIG. 5a) comprising driving arms for example. The gripper device may form part of a robotic system which includes a control unit (not shown) that may be any type of a computer implemented device, that for example triggers different gripper device movements based on input data from sensors.

The displacement mechanism 511 is adapted for moving at least one of the first structure 101 and the counter hold 102 away and towards each other as indicated by arrows 123b and 123a, respectively, in FIG. 1a.

The gripper device 100 further comprises a tilting mechanism 510 (see FIG. 5a), that may be an integral part of the displacement mechanism 511, for rotating the first blade portion 104 about a horizontal axis 120 perpendicular to the moving direction of the first structure. The tilting mechanism 510 may for example comprise an extendable and contractable elongated actuator structure such as a cylinder (or pair of cylinders) which extends between the first structure and the displacement mechanism 511. The actuator may be pneumatically, electrically or hydraulically driven, for example.

In the illustrated embodiment, the first structure 101 includes a frame 111 to which the blade portion is attached in a pivotable manner about the horizontal axis 120. The movement of the frame 111 is operated by the displacement mechanism 511. The frame is slideably mounted to a pair of slider tracks 130 (which could instead be in the form of a single slider track or more than two slider tracks).

In the embodiment shown here, the gripper device 100 further comprises a second structure 103, which as shown here has an L-shaped structure (reversed with respect to the L-shape of the first structure 101) or a fork like structure. The second structure has a second blade portion 106 and an upstanding support portion 109. The second blade portion 106 is arranged such that the first blade portion 104 and the second blade portion 106 oppose each other with the counter hold 102 arranged between the first and the second structures. The second blade portion 106 is adapted to provide an under-support for the stacked food slices 113.

Both the second structure 103 and the counter hold 102 may be moveable by the displacement mechanism 511, which may be any type of pneumatically, electrically or hydraulically operated mechanism that is well known to a person skilled in the art. As an example, the upstanding support portion 109 of the second structure 103 may also be slideably mounted to the slider track(s) 130 of the displacement mechanism 511 to govern its back and forth motion. The counter hold 102 may be also be slideably mounted to the same, or different, slider track(s), or to an arm (not shown), such as the one discussed in relation to the first structure 101, extending between the displacement mechanism 511 and the counter hold 102.

The second blade portion 106 of the second structure 103 comprises in this embodiment plurality of spaced apart teeth 107, with each tooth elongated along a longitudinal axis parallel to the longitudinal axes of the other teeth. The counter hold 102 comprises spaced apart openings 108 positioned such that the longitudinal axes of the spaced apart teeth 107 extend through the spaced apart openings 108.

Moreover, in one embodiment the gripper device 100 further comprises a top structure 116 operably connected to a top structure displacement mechanism 117 for allowing a vertical movement of the top structure as indicated by arrow 124 in FIG. 1a. The top structure is adapted to facilitate the release of the stacked food slices 113 from the gripper device at the second position by applying a vertical force onto the stacked food slices 113 through a downward movement of the top structure by the top structure displacement mechanism 117.

Figure 1B:
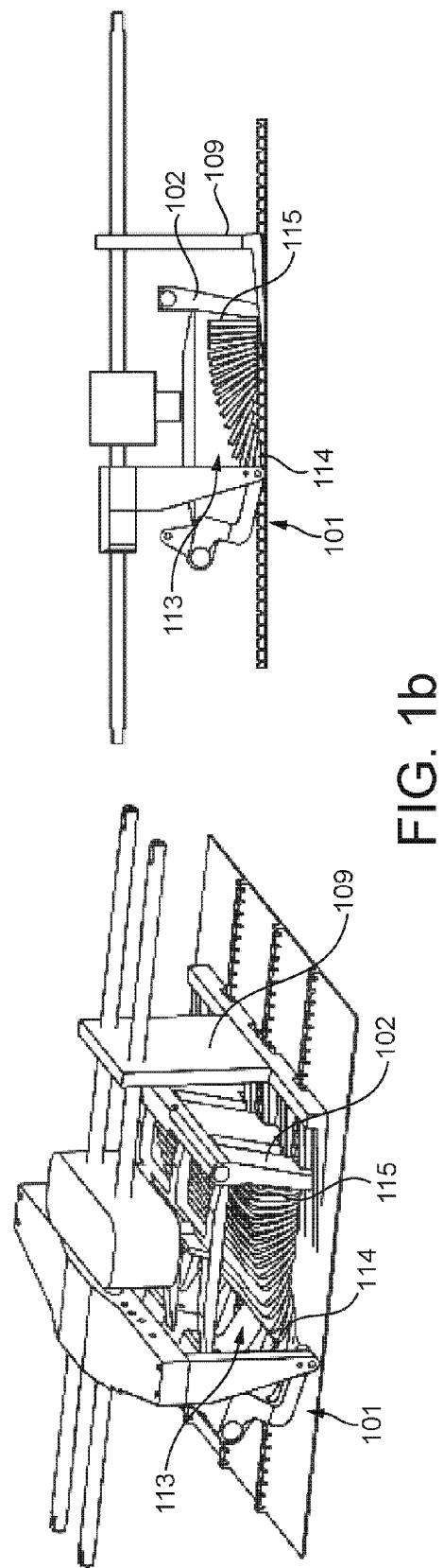

When a group of food slices is picked up, the first structure 101 and the counter hold 102 are in an open position as shown in FIG. 1b with the first structure arranged adjacent to a first food slice 114 that is resting on the support surface 112, which may for example be a conveyor belt. The counter hold 102 is arranged at the opposite end of the group of food slices 113 adjacent to an end slice 115 at the opposite end of the group of food slices.

Figure 1C:
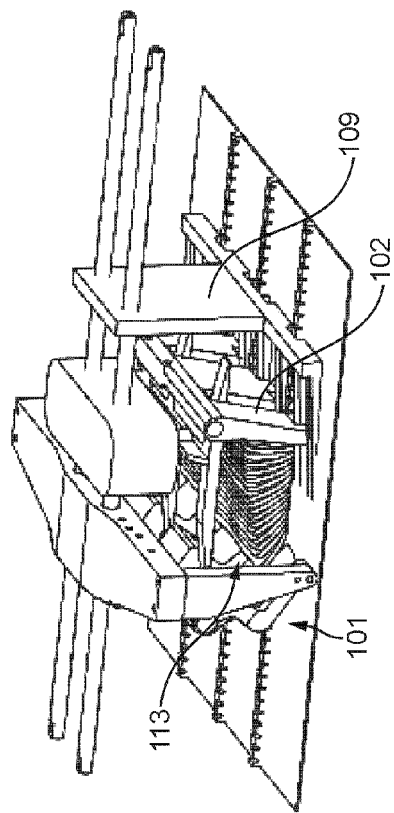
Figure 1C:
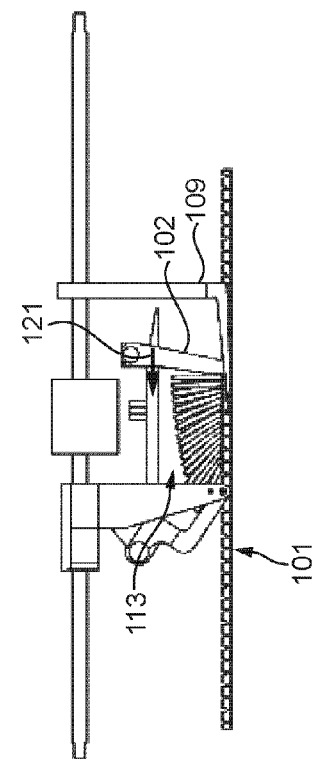
Figure 1D:
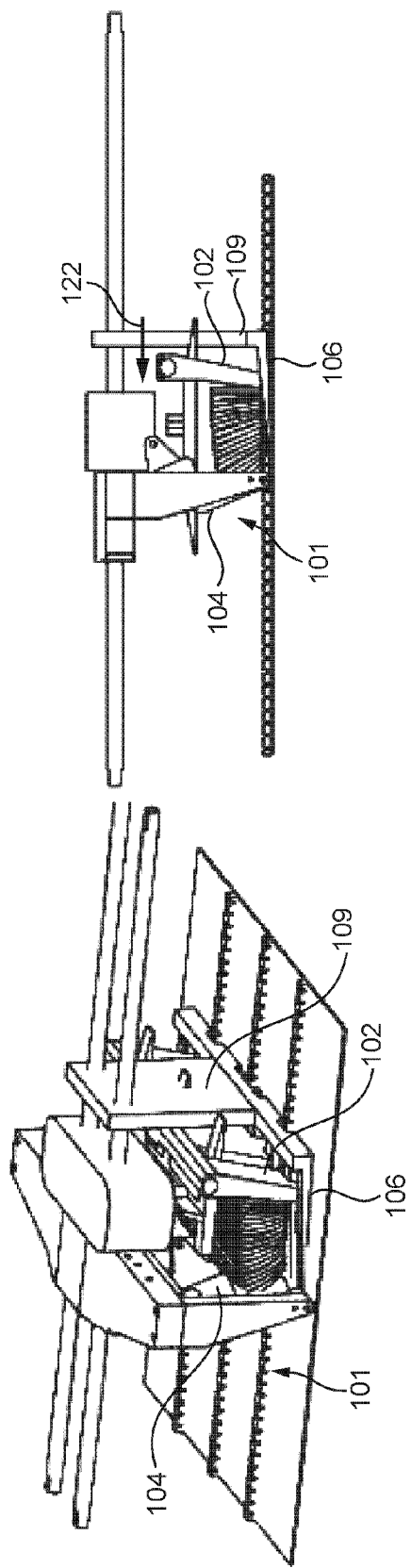

FIGS. 1c and 1d show where at least one of the first structure 101 and the counter hold 102 move from the open position towards a contracted position. For example, only the counter hold 102 may move towards the first structure 101 as indicated by arrow 121. During this movement, the tilting mechanism 120 adjusts the angle of the first structure 101 such that it becomes tilted towards the counter hold 102 causing the group of food slices 113 to be arranged vertically in a stacked way such that the first blade portion 104 of the first structure 101 acts as a first vertical support side for the stacked food slices 113 and the counter hold acts as a second support side for the stacked food slices 113.

The movement of the counter hold and/or the first structure may coincide with, overlap with or followed by a movement of the second structure 103 as indicated by arrow 122 in FIG. 1d until the spaced apart teeth extend through the spaced apart openings 108 of the counter hold 102 with their distal ends positioned adjacent or beyond the structure. In that way the second blade portion of the second structure 103 provides an under-support for the vertically stacked food slices 113.

FIG. 1e shows where the gripper device 100 has picked up the stacked food slices 113 from a first position, which may be a position where they have just been sliced for example by a high-speed slicer, and moves the food slices towards a second position, which may be a product loading and sealing area.

Figure 1G:
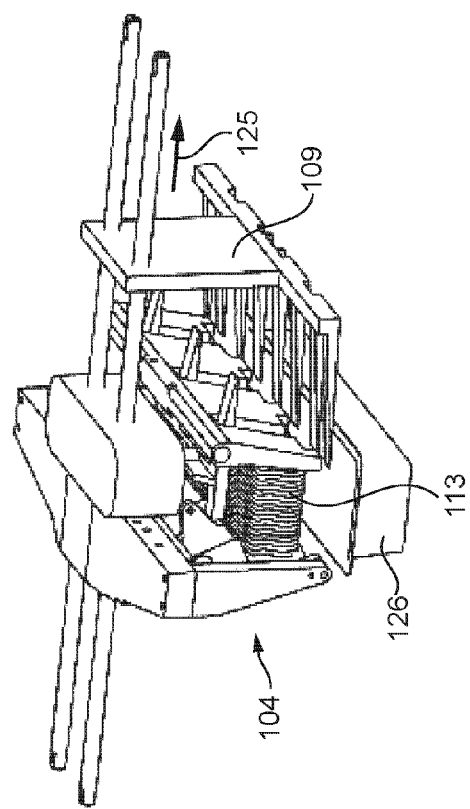
Figure 1G:
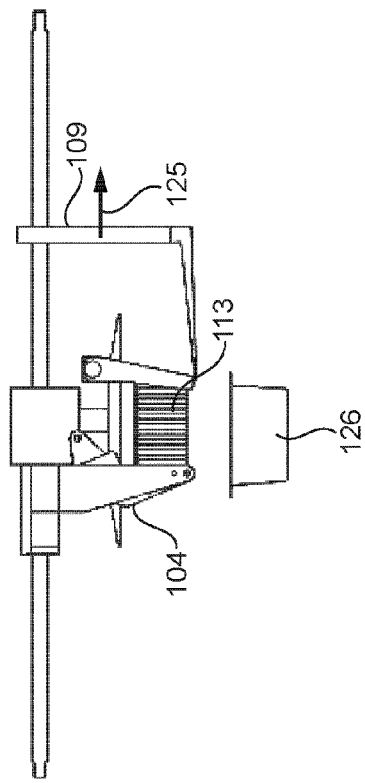

FIG. 1f shows where the gripper device 100 is positioned above a packaging receptacle, for example a tray 126 at the second position, and FIG. 1g shows where the second structure 103 moves back towards the open position as indicated by arrow 125, to allow the release of the stacked food slices 113 and into the tray 126.

Figure 1H:
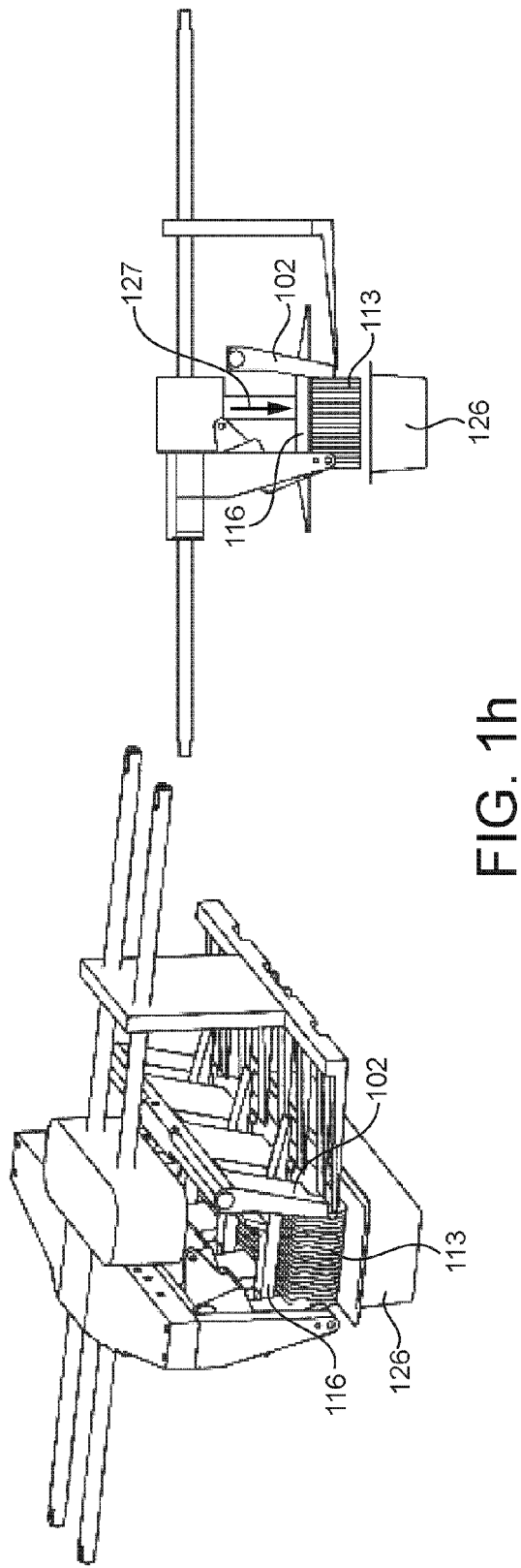
Figure 1I:
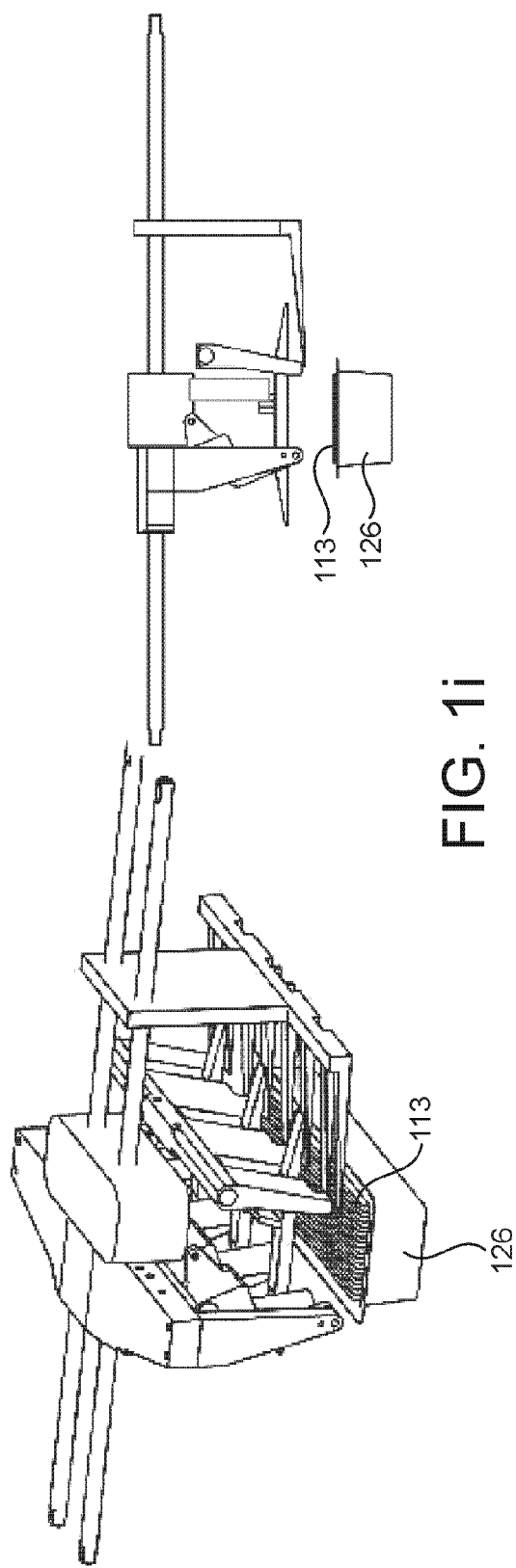

Either shortly before, or subsequent to the withdrawal of the second structure as shown in FIG. 1g, the top structure 116 moves downwards as indicated by arrow 127 and exerts a vertical force onto the stacked food slices 113 so as to facilitate the release of the stacked food slices 113 from the gripper device 100 as depicted in FIG. 1h and FIG. 1i.

Moving the top structure 116 downwards onto the top of the stack before the second structure 103 has been withdrawn may be preferable as it may tend to squeeze the stack between the top and second structures. This may be beneficial in that it may improve the alignment of the slices in the direction parallel to the movement of the top structure, before they are ejected from the gripper by further downward movement of the top structure.

In a preferred embodiment, the side support provided by the first structure 101 and the counter hold 102 exerts opposing horizontal forces on the stacked food slices 113. This acts to compress the stacked food slices 113 together, such that the stacked food slices 113 are restrained from sliding out from the gripper device 100 due to the forces of gravity. The release of the stacked food slices 113 is then achieved by the action of the top structure 116. Also, the stacked food slices 113 are released into the tray 126 in a compressed state, as indicated in FIG. 1i, which means that less packaging receptacle material is needed.

Figure 2:
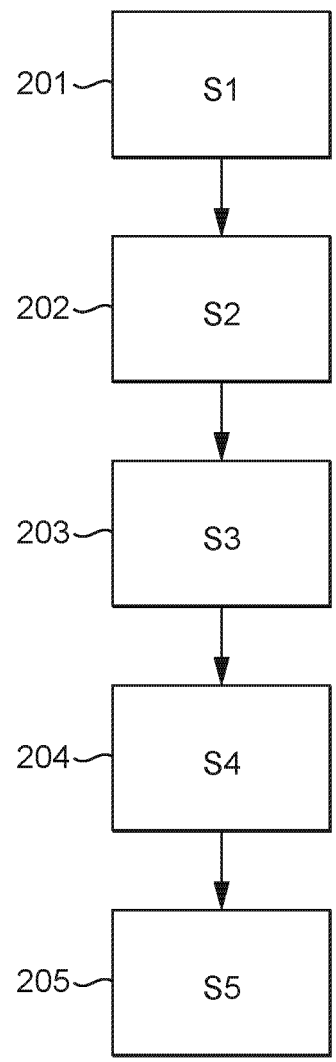
FIG. 2 shows a flowchart of a method according to an embodiment of the present invention to pick up and release a group of food slices.

FIG. 2 shows a flowchart of a method according to an embodiment of the present invention for picking up and moving a group of food slices from a first position to a second position where the food slices are released, using a gripper device according to the present invention, such as the one discussed in relation to FIGS. 1a-1i.

In step S1 201, the first structure and the counter hold are moved towards opposite ends of a group of food slices to be picked up such that the first structure is positioned adjacent to a first food slice at one end of the food slices resting on the support surface, and the counter hold is positioned adjacent to the slice at the opposite end of the group.

In step S2 202, at least one of the first structure and the counter hold is moved towards the other, so that the gripper device changes from an open position towards a contracted position.

In step S3 203, the tilting angle of the first structure is adjusted such that it becomes tilted towards the counter hold. The adjustment of the tilting angle causes the group of food slices to be arranged vertically in a stacked way such that the first blade portion of the first structure acts as a first support side for the food slices and the counter hold acts as a second support side for the stacked food slices 113.

In a preferred embodiment, the method further comprises step S4 204 of applying a vertical force onto the stacked food slices 113 when releasing the stacked food slices 113 at the second position vertically into a compartment of a packaging receptacle while the stacked food slices 113 are being compressed together by the first structure and the counter hold. The compartment may have a shape which essentially follows the shape of the food slices in their compressed state.

Preferably, the method further comprises step S5 205 of providing an under-support for the stacked food slices 113. This may be relevant if for example the group of slices is relatively heavy and/or if the side forces applied to the group of food slices by the first structure and counter hold are not sufficiently high to reliably restrain the slices against gravity or acceleration experienced during movement of the gripper device, and/or to eliminate the risk of that the group of food slices may slide out of the gripper device unintentionally.

Figure 3:
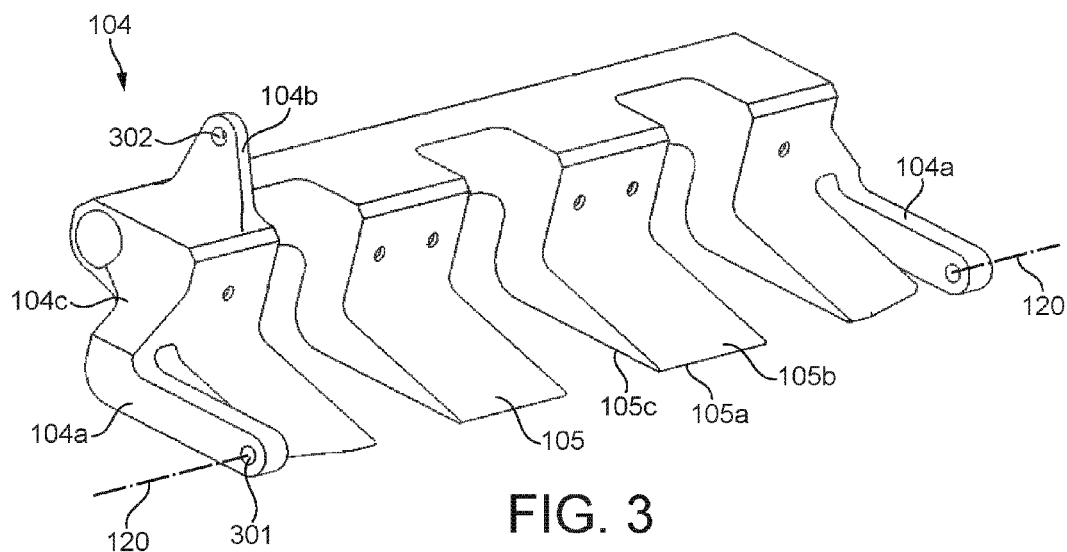

FIG. 3 depicts an enlarged view of the first blade portion 104 shown in FIG. 1a. It has four spaced apart teeth 105, for example, each having a leading edge 105a, an upper surface 105b and a lower surface 105c. The teeth are preferably wedge-shaped, at least at their distal ends. The blade portion may define an angle between its upper and lower surfaces at its leading edge(s) of about 20°, for example 20°±10° or more preferably 20°±5°. The leading edge(s) of the blade portion may be relatively narrow or more rounded in side profile or have another profile to suit a particular application.

At each end of the blade portion, an arm 104a extends away from its body 104c in the same direction as the teeth 105. Each arm defines an opening 301 close to its distal end to enable the first blade portion to be connected to the frame 111 in a hinge-like manner. The openings define the axis 120 about which the blade portion pivots in use at a location adjacent to the leading edges 105a of the teeth. The leading edges of the teeth are parallel or substantially parallel to the axis. In the case of the outer teeth, their leading edges may be angled with respect to the axis, such that the spacing between the edges and the axis increases towards the outside of the blade portion.

A projection 104b extends upwardly away from an upper surface of the blade portion and includes a connecting means in the form of a further opening 302 for connecting the first blade portion 104 to the moving and tilting mechanism 510 of the gripper device, as will be described further below.

Figure 4:
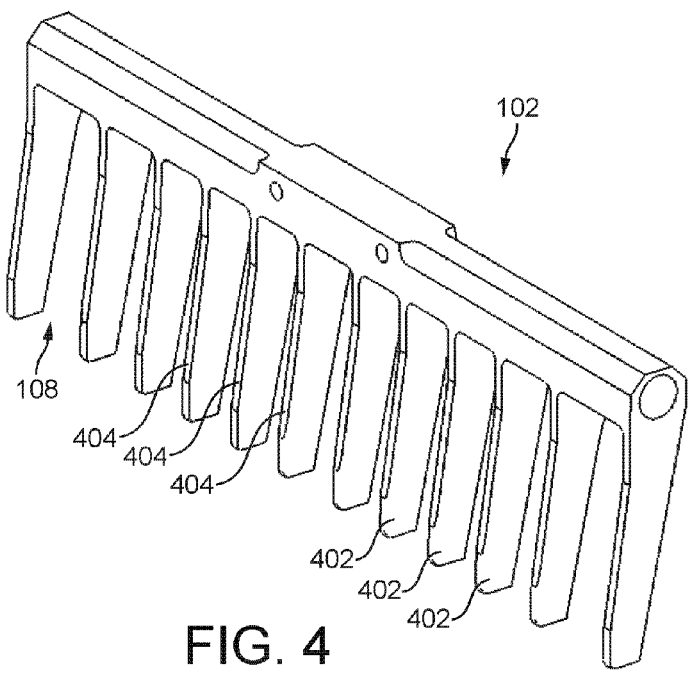

FIG. 4 depicts a perspective view of the counter hold 102 shown in FIG. 1a and shows its spaced apart openings 108 in greater detail. The openings are defined between a plurality of aligned fingers 402. The front faces 404 of the fingers together define an engagement surface 406 (indicated on FIG. 1a) of the counter hold for engaging one end of a stack of food slices.

Figure 5A:
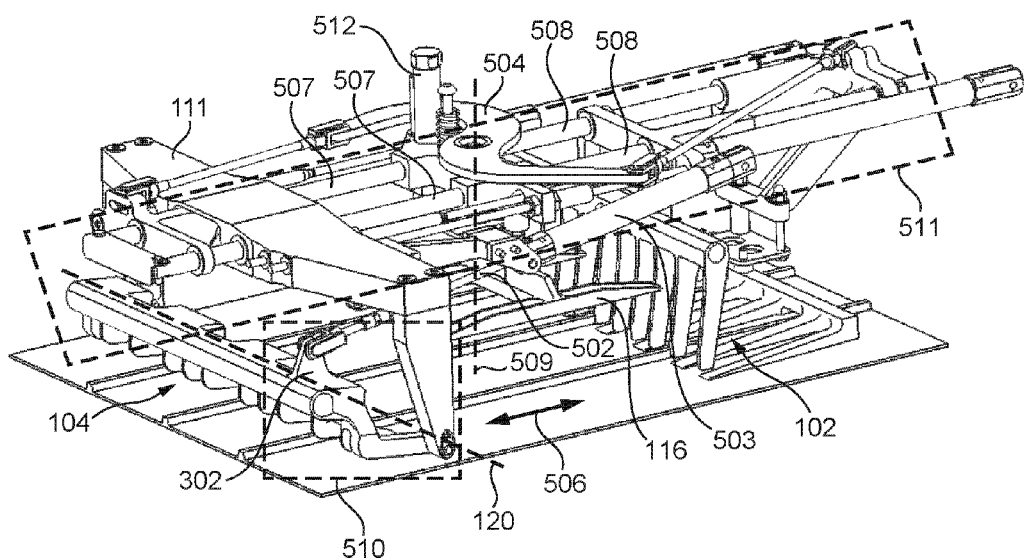
FIGS. 5a to 5c show perspective views of the gripper device of FIGS. 1a-1i including its tilting and displacement mechanisms, at successive stages in transition of the device from an open to a closed configuration.
Figure 5B:
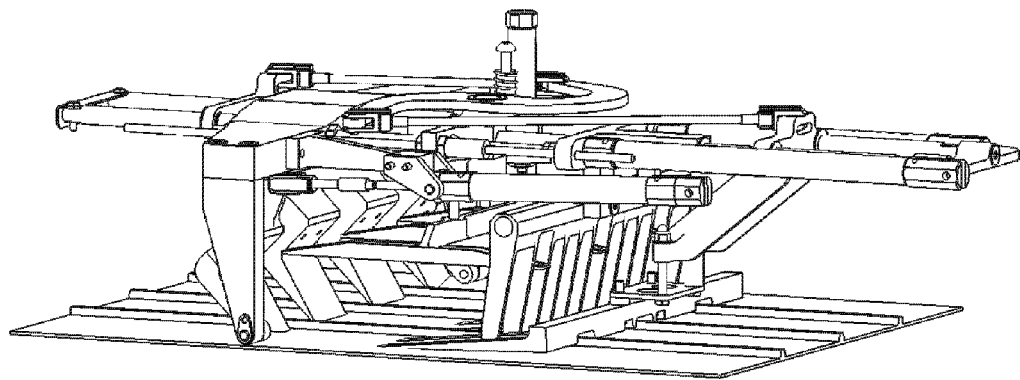
Figure 5C:
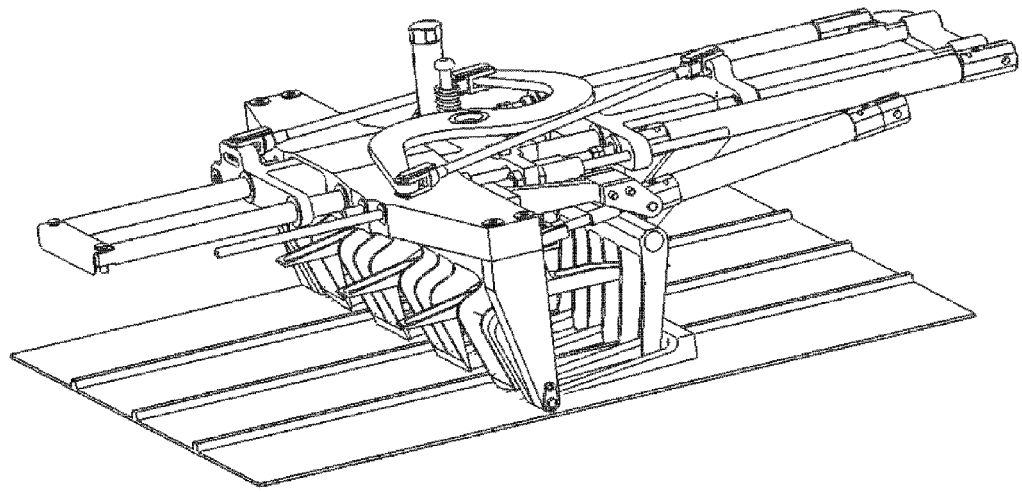

FIGS. 5a to 5c show the gripper device of FIGS. 1a-1i and include its tilting and displacement mechanisms 510 and 511.

The tilting mechanism 510 is adapted to alter the angle of the first blade portion 104 of the first structure 101 about the horizontal axis 120. This axis is perpendicular to the moving direction of the first structure 101 which is indicated by arrow 506.

The displacement mechanism 511 is adapted to move the first structure 101 and the counter hold 102 towards and away from each other.

A top structure displacement mechanism 117 (a pneumatic cylinder 512 in this embodiment) is arranged to provide up and down movement of the top structure 116. The movement of the top structure may be pneumatically, electrically or hydraulically driven for example.

Tilting of the first blade portion 104 may as shown here be achieved by connecting the openings 301 to the frame 111 (as discussed in relation to FIGS. 1a-1i) in a hinge-like manner and by connecting the projection 104b to an elongate rod 502 that is slideable within a housing 503. The movement of the rod may be pneumatically, electrically or hydraulically driven for example. The orientation of the first blade portion relative to the axis 120 is adjustable by movement of the rod between a first position in which the angle defined between the lower surface 105c of the blade portion and the support surface is substantially 0° (see FIG. 5a) and a second position in which the angle defined between the upper surface 105b of the blade portion and the support surface is substantially 90° as shown in FIG. 5c.

The displacement mechanism 511 includes two parallel or two sets of parallel guides, tracks or rods 507, 508 to which the frame 111 and the counter hold 102 are slideably coupled to allow back and forth linear displacement thereof. In the embodiment depicted, the back and forth movement towards or away from each other is achieved via rotational movement of a connection member, such as an S-shaped member 504, around a vertical rotational axis 509. The rotational movement of the S-shaped member 504 may be pneumatically, electrically or hydraulically driven for example. The distal ends of the S-shaped member are directly or indirectly connected to the frame 111 and the counter hold 102, respectively, so that rotation of the S-shaped member causes the frame 111 and the counter hold 102 to move towards or away from each other. Successive stages in the movement of the frame 111 and the counter hold 102 towards each other are shown in FIGS. 5a to 5c.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Where features and operations are described and/or claimed with reference to the gripper device, it will be appreciated that those aspects are equally applicable to the methods described and/or claimed herein. Similarly, features and operations described and/or claimed with reference to methods of using a gripper device are equally applicable to the gripper device configurations described and/or claimed herein.

The invention claimed is:

1. A method for picking up a group of food slices using a gripper device, the group of food slices being arranged with a slice at one end lying on a support surface and each subsequent slice through to the slice at the other end lying against the preceding slice and being displaced relative to the preceding slice along a displacement direction, wherein the gripper device comprises:
   a first structure comprising a first blade portion having a leading edge and an upper surface for sliding beneath the one end of the group of food slices;
   a counter hold which defines an engagement surface for engaging the slice at the other end of the group of food slices;
   a displacement mechanism for moving at least one of the counter hold and the first structure towards and away from the other; and
   a tilting mechanism for tilting the first blade portion, and wherein the method comprises the steps of:
      moving the first structure and the counter hold towards the group of food slices to be picked up such that the first structure is positioned adjacent to the slice at the one end of the group of food slices, and the counter hold is positioned adjacent to the slice at the other end of the group of food slices;
      moving at least one of the first structure and the counter hold towards the other along the displacement direction with the displacement mechanism so that the upper surface of the first structure slides beneath the slice at the one end of the group of food slices;
      tilting the first blade portion with the tilting mechanism into a tilted orientation such that the upper surface of the first blade portion faces towards the engagement surface of the counter hold, causing the slice at the one end of the group of food slices to be tilted from an initial orientation lying on the support surface to an upright, stacked position where the slice at one end is resting on its edge on the support surface, and causing the group of food slices to be arranged in a stack of food slices extending between the first blade portion and the engagement surface; and
      picking up the stack of food slices with the first blade portion held in the tilted orientation.

2. The method according to claim 1, wherein the stack of food slices is compressed by the first blade portion and the counter hold, and the method includes releasing the stack of food slices into a compartment of a packaging receptacle while the stack of the food slices are compressed together.

3. The method according to claim 1, further comprising applying a downward force onto the stack of food slices when releasing the stack of food slices while the stack of food slices are compressed.

4. The method according to claim 1, further comprising providing an under-support for the stack of food slices.

* * * * *